S. W. CADY.
DISK HARROW.
APPLICATION FILED NOV. 22, 1918.
1,433,068.
Patented Oct. 24, 1922.
2 SHEETS—SHEET 2.
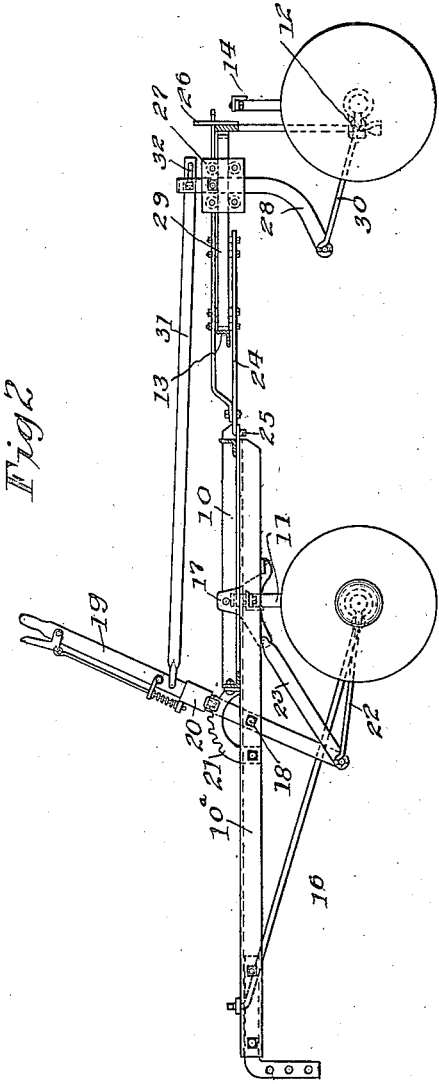
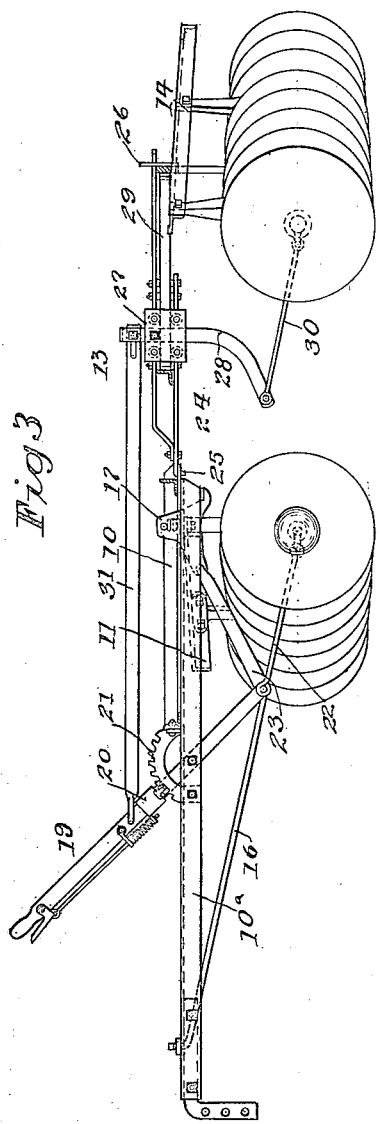
Inventor
Sherman W. Cady,
by Chas. E. Lord
Atty Patented Oct. 24, 1922.

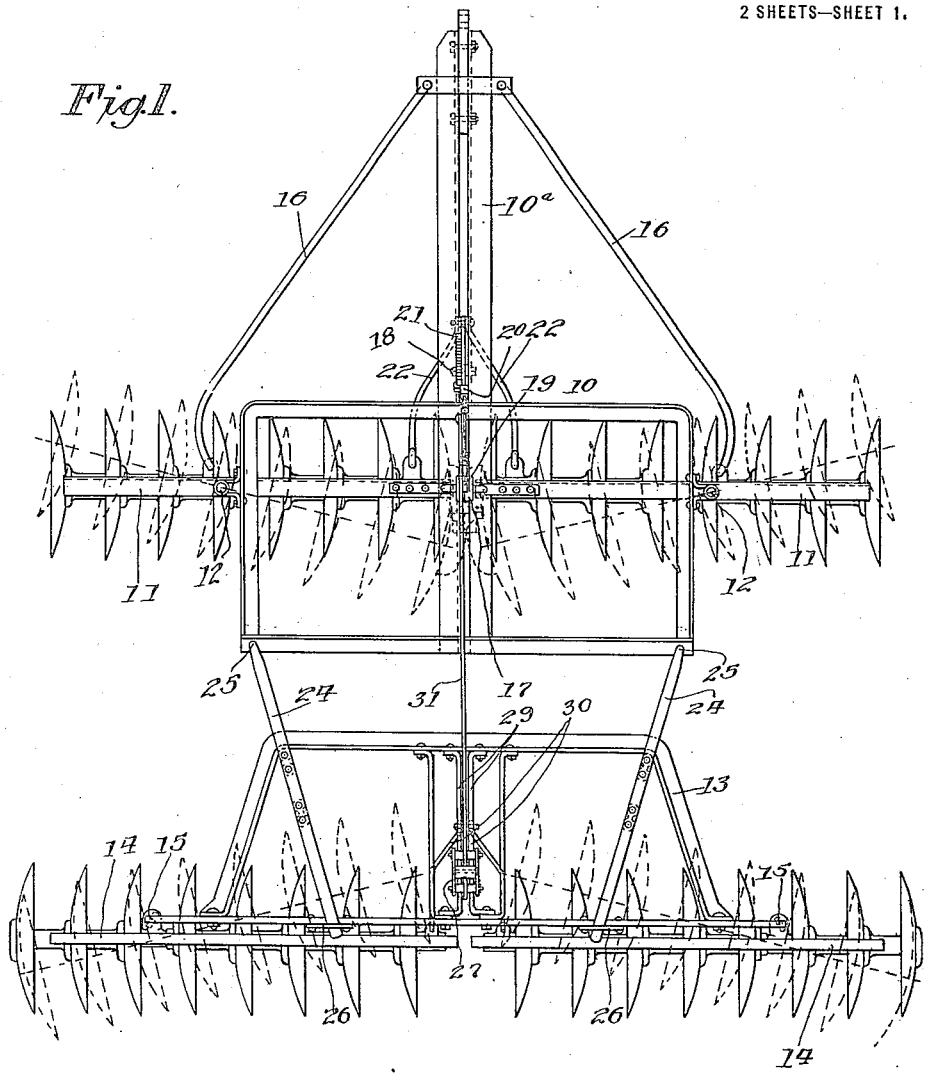

1,433,068

UNITED STATES PATENT OFFICE.

SHERMAN W. CADY, OF AUBURN, NEW YORK, ASSIGNOR TO INTERNATIONAL HARVESTER COMPANY, A CORPORATION OF NEW JERSEY.

DISK HARROW.

Application filed November 22, 1918. Serial No. 263,781.

*To all whom it may concern:*

Be it known that I, SHERMAN W. CADY, a citizen of the United States, residing at Auburn, in the county of Cayuga and State of New York, have invented certain new and useful Improvements in Disk Harrows, of which the following is a full, clear, and exact specification.

This invention relates to double disk harrows.

The types of double disk harrows hitherto known could not be backed any great distance without first straightening the gangs, particularly the gangs of the rear unit. This unit usually is hingedly connected to the front unit quite a distance above the shafts of the gangs of both sections. Consequently in backing, the thrust is downward and the gangs of the rear unit are forced sharply into the ground especially if it is at all soft; and as there is no rigid connection between the sections the front section will tend to rise and turn over the rear unit.

An object of this invention is therefore to provide a double harrow in which the gangs of the harrow will automatically straighten on backing, thereby permitting the harrow to be backed indefinitely.

Another object is to provide a double harrow which automatically straightens in backing, and which remains locked on a forward pull in whatever position it is at the beginning of the forward pull.

Another object is to provide a double disk harrow with means for angling on a forward pull of the harrow.

These and other objects as will appear in the following specification, are accomplished by my invention, which consists of a double harrow having front and rear units and means for straightening all gangs in the operation of backing.

Referring now to the drawings,—

Figure 1 is a plan view of my harrow;

Fig. 2 is a vertical section taken near the center showing the gangs straight; and Fig. 3 is the same with the gangs angled.

My invention is embodied in the double harrow as shown, comprising front and rear units, the front unit having a frame 10 on which is hingedly mounted two disk gangs 11 at the hinge points 12, 12, the rear unit having a frame 13 on which is hingedly mounted disk gangs 14 at the hinge points 15. It will be noticed that the hinge points are in all cases outside the center of the disk gangs so that as the harrow is drawn forward the inner ends of the front gangs tend to swing back as more disks are placed inside the pivot points than outside. Owing to the action of the ground on the rear disks which are dished in the opposite direction from those on the front gangs, the inner ends of the rear gangs are raised in backing. This forces the outer ends into the ground and causes them to straighten. Brace rods 16 are fastened to the first gang bearings just below the pivot points and to the forward end of the frame angles 10ª.

The angle bars 10ª and the frame structure connected therewith including the draft elements 24 for the rear section constitute a draft unit which moves relatively to the gangs during their pivotal or angling motion.

The inner ends of the forward gangs are secured to the guide block 17 which is slidable between the frame angles 10ª. Between these angles is pivotally mounted at 18 a lever 19 which has a detent 20 in engagement with a sector 21. The teeth of this sector are made sloping toward the rear so that the lever ratchets when pushed backward.

The lower end of the lever is connected to the inner ends of the front disk gangs and to the guide block 17 by links 22 and 23 respectively.

The rear unit is connected to the front unit by means of two telescopic draft members 24, placed one on each side of the center line. These are hingedly connected to the front harrow unit at 25 and are formed of upper and lower members which lie above and below the forward part of the frame 13, the upper member extending back over the rear frame and through the guide loop 26. This allows the two frames to approach each other as the harrow is backed or turned.

A sliding block 27 having an arm 28 is made slidable on two guide bars 29 which form a part of the rear frame. Two links 30 are pivotally attached to the arm 28 and to the inner ends of the rear gangs. Connection is made between the angling means of the gangs of the front and rear units by the link 31 which is pivotally connected at the front end to the lever 19 and to the rear sliding block 27. An elongated slot 32 is made in the rear end.

The result of the slot 32 is that as the harrow is backed the front gangs will start to straighten before the forward end of this slot is reached and usually before the rear gangs start to straighten. The result of this arrangement is that as the harrow is forced back the front and rear disk gangs straighten owing to the action of the ground on the disks as previously explained, and the rear gangs are also straightened somewhat by the link 31 due to the straightening action of the front gangs.

To angle the gangs the operator pulls the lever 19 forward after releasing the detent, or the harrow may be pulled forward with the detent released, when the gangs will angle due to the action of the ground.

While I have shown and described but a single embodiment of my invention, it is to be understood that it is capable of many modifications. Changes, therefore, in the construction and arrangement of parts may be made without departing from the spirit and scope of the invention as disclosed in the appended claims:

1. In a harrow, front and rear sections, disk gangs carried by each section, means for utilizing the action of the ground on the disks for straightening the gangs of the front section, and means including a sliding block on the rear section, and a link connected thereto and to said first means for straightening the gangs of the rear section.

2. In a double disk harrow, front and rear sections, gangs on each section, a control lever connected to the inner ends of the front gangs, ratchet means cooperating with a pawl on said lever to permit it to swing freely in one direction and the front gangs to automatically straighten in backing, and means connected to said lever for utilizing the action of the ground on the front gangs to straighten the rear gangs.

3. In a double disk harrow, front and rear sections, gangs on each section, a control lever connected to the inner ends of the front gangs, ratchet means cooperating with a pawl on said lever to permit it to swing freely in one direction and the front gangs to automatically straighten in backing, and means for communicating said movement to the rear gangs including a central angling link connected to said lever, a sliding block on the rear section and connected to the rear gang and a connection between said rod and block.

4. In a double disk harrow, front and rear sections, gangs on each section, a control lever connected to the inner ends of the front gangs, ratchet means cooperating with a pawl on said lever to permit it to swing freely in one direction and the front gangs to automatically straighten in backing, and means connected to said lever to straighten the rear gangs, said ratchet providing adjustable locking means during return movement of said lever for locking the gangs in various adjusted positions.

In testimony whereof I affix my signature.

SHERMAN W. CADY.